United States Patent [19]

Pröll et al.

[11] Patent Number: 4,810,178

[45] Date of Patent: Mar. 7, 1989

[54] APPARATUS FOR MOLDING OUTER AND INNER SOLES ONTO SHOE UPPERS

[75] Inventors: Manfred Pröll; Günter Rebers, both of Achim-Baden, Fed. Rep. of Germany

[73] Assignee: Klockner Ferromatik Desma GmbH, Malterdingen, Fed. Rep. of Germany

[21] Appl. No.: 116,666

[22] Filed: Nov. 4, 1987

[30] Foreign Application Priority Data

Nov. 5, 1986 [DE] Fed. Rep. of Germany ....... 3637696
Dec. 20, 1986 [DE] Fed. Rep. of Germany ....... 3643822

[51] Int. Cl.⁴ .................................................. B29C 45/16
[52] U.S. Cl. ............................... 425/112; 36/30 R; 264/244; 264/511; 425/119; 425/129.2; 425/405.1; 425/576
[58] Field of Search .............. 425/112, 119, 129.2, 425/575, 576, 405.1; 264/511, 244; 36/30 R

[56] References Cited

U.S. PATENT DOCUMENTS

| | | | |
|---|---|---|---|
| 3,315,317 | 4/1967 | Winkler | 425/119 |
| 3,443,279 | 5/1969 | McIlvin et al. | 425/119 |
| 3,496,608 | 2/1970 | Eldred et al. | 425/119 |
| 3,667,883 | 6/1972 | Ludwig et al. | 425/119 |
| 3,915,608 | 10/1975 | Hujik | 425/119 |
| 4,090,831 | 5/1978 | Hujik | 425/129.2 X |
| 4,123,493 | 10/1978 | Schilke et al. | 425/119 X |
| 4,302,416 | 11/1981 | Rudolf et al. | 425/129.2 X |
| 4,608,724 | 9/1986 | Stengelin | 425/119 X |

FOREIGN PATENT DOCUMENTS

2241493 6/1975 Fed. Rep. of Germany .
2288488 5/1976 France ................. 425/119

OTHER PUBLICATIONS

Publication No. DESMA 521S-526S, Klöckner-Ferromatik Desma GmbH, entitled "Injection Molding Machine for Direct Attachment of Soles", no date available.

*Primary Examiner*—Richard L. Chiesa
*Attorney, Agent, or Firm*—Watson, Cole, Grindle & Watson

[57] ABSTRACT

An apparatus for molding an outer sole of elastomer and an inner sole of a mixture of isocyanate and a polyol reacting into polyurethane to shoe uppers includes a vertically movable upper cross block supporting a pivotably mounted mold carrier with a heatable first mold part at one end for the molding of outer soles, and a lower, vertically adjustable cross block has a heatable plate in contact with the first mold part. The mold carrier is pivoted such that the heatable first mold part containing the molded outer sole forms a mold cavity for an inner sole together with laterally movable mold elements and a last supported shoe upper. A vertically adjustable last body has a transfer plate which transfers the molded outer sole from the heatable first mold part for cooling before the molded outer sole is transferred back to a cooled mold part at the opposite end of the mold carrier, after which the last supported shoe upper is rotated to confront the outer sole and the lateral mold elements are closed to define a cavity for the molding of the inner sole.

2 Claims, 6 Drawing Sheets

APPARATUS FOR MOLDING OUTER AND INNER SOLES ONTO SHOE UPPERS

RELATED APPLICATIONS

This application relates to U.S. Serial No. 116,361 filed on even date herewith, corresponding to German Application Nos. P 36 438 21.9-26 and P 36 376 97.3, respectively filed Dec. 21, 1986 and Nov. 5, 1986, relates to U.S. Ser. No. 135,369, filed Dec. 21, 1987, corresponding to German Application No. P 36 438 20.0-26, filed Dec. 20, 1986, and further relates to U.S. Ser. No. 942,832, filed Dec. 17, 1986.

BACKGROUND OF THE INVENTION

This invention relates to the molding of outer and inner soles onto shoe uppers, the outer sole consisting of an elastomer material and the inner sole consisting of a thermoplastic material, the inner and outer soles being joined together by a chemical bond between isocyanate contained in the thermoplastic material and reactive end group substances added to the elastomer. The apparatus has a vertically moveable upper cross block with a mold carrier mounted thereon for pivotal movement about a transverse axis, the mold carrier having a heatable first mold part at one end for the molding of outer soles in a molding position of the apparatus. A vertically moveable lower cross block has a mold plate in engagement with the first mold part in the molding position. The pivotable mold carrier together with lateral mold elements of the apparatus and a shoe last-mounted shoe upper cooperate together to define a cavity for the molding of the inner sole.

The molding apparatus may be located at each of a plurality of molding stations on a circular turntable for carrying out the molding operation.

German Pat. No. 22 41 493 discloses shoes with an inner sole of polyurethane and an outer sole also of polyurethane.

Circular turntable installations providing a plurality of molding stations are generally disclosed in Publication No. DESMA 521S-526S, Klöckner-Ferromatik Desma GmbH, and entitled "Injection Molding Machine For Direct Attachment Of Soles." The circular turntable installations have two devices for the mixing of isocyanate and a polyol into a mixture reacting into polyurethane which, depending on the mixing ratio and the additives, reacts into a wear-resistant outer sole or a flexible inner sole.

The circular turntable is rotated incrementally for molding the outer soles and the inner soles. The molding stations are stopped during incremental movement and interlocked when stopped relative to the two mixing and injection devices.

These devices are located along the periphery of the turntable and are movable in a radial direction toward the turntable. The molding apparatus at each station has two lateral molding elements which, in a mold closed position, define an opening and two sprue channels.

A vertically moveable last turning body is mounted on the apparatus above the lateral mold elements, the body having a counterstamp and a shoe last for supporting the shoe uppers.

A vertically adjustable bottom stamp is located below the lateral mold elements. The bottom stamp, lateral mold elements in their mold closing position and the counterstamp together define a mold cavity into which the mixture reacting into the outer sole is introduced.

The bottom stamp which contains the molded outer sole, the lateral mold elements in a mold closed position, and the shoe last which supports the shoe upper together define a mold cavity for molding the inner sole as the mixture reacting into the inner sole is introduced into the mold cavity which, in the course of the reaction, bonds to the outer sole and to the shoe upper.

U.S. Ser. No. 942,832, among the aforementioned related applications, discloses molding stations on a circular turntable for the molding of shoe soles with an outer sole of elastomer and an inner sole of polyurethane.

For the molding of the outer sole of elastomer, there is provided, in lieu of a previously employed device for mixing the mixture reacting into polyurethane, a plastification and injection aggregate device for plastification of the elastomer, as employed in injection molding machines for the processing of thermoplastic synthetic materials, and for injection of the elastomer into the outer sole mold cavity. Since high pressures occur during the injection of the plastified elastomer, the molding apparatus at each station is provided with an upper, vertically adjustable cross block supporting a pivotably mounted-mold-carrier-with pairs of opposing heatable mold parts lying parallel to the pivot axis, each mold part defining a mold cavity for the outer sole and including cooling channels.

A lower, vertically adjustable cross block below the first cross block has a heatable plate facing the mold carrier and cooperates with the heatable mold parts thereof for the production of outer soles. Above the upper vertically moveable cross block is a fixed cross block having an opening into which a heatable mold part with a molded outer sole in its mold cavity projects and combines together with laterally movable mold elements, located above the fixed cross block, for the molding of an inner sole of polyurethane.

The mixtures which react into polyurethane for the outer sole and/or for the inner sole essentially consist of a polyol and isocyanate, as well as chain extenders and catalysts, which are adjusted by the respective additives for the desired material properties of the outer soles and/or inner soles, whereby the outer sole is rendered wear resistant and the inner sole flexible having a porous structure.

The chemical reaction starts with the mixing of the components. In the mold, the mixtures react into outer soles or inner soles. During the reaction into the inner sole, the molding of the sole takes place simultaneously with the bonding to the shoe upper and to the outer sole.

The outer sole of elastomer and the inner sole of polyurethane are bonded in the area of their contacting surfaces by chemical bonds between isocyanate and reactive end groups of the substances added to the elastomer.

As likewise employed for the present invention, the mixtures reacting into polyurethane are mixtures on the basis of ether or esterpolyols, containing on the basis of 100 parts by weight:

30–100 parts by weight isocyanate;

0.1–10 parts by weight catalyst;

the remainder chain expanders; and other usual additives.

The catalyst which may be used is DABCO-SB produced by Airproducts Company.

The outer soles are made from elastomers which can be mixed with the following chemical compounds or chemical substances in quantitative shares of 0–20 phr, relative to the rubber amount: e.g., acryl-nitryl-rubber, styrol-butadiene-rubber, natural rubber, chloroprene-rubber.

The outer soles can generally be produced from any known rubber quantities if, for example, the following substances are mixed in quantities of 0–20 phr (quantity relative to the amount of rubber used):

Phenolformaldehyde resins, e.g.
    VULKADUR A (Bayer AG)
    CORETACK (BASF)
methylolized phenolformaledhyde resins, e.g.:
    SP 1045 (Krahn)
    KOREVER (BASF)
resorcin in connection with a formaldehyde dispenser, e.g.:
    COHEDUR A (Bayer AG)
    COHEDUR RS (Bayer AG)
    COHEDUR RK (Bayer AG)
silicic acid fillers, e.g.:
    VULKASIL S (Bayer AG
    ULTRASIL (Degussa)
aminoalcohol, e.g.:
    3-amino-propanol
primary or secondary amine, e.g.:
    Stearylamine
polyvinylalcohol, e.g.:
    MOWIWOL (Hoechst)
    VSH 72 (AIR PRODUCTS)
    VSH 73 (AIR PRODUCTS)
high hydroxylgroup containing polyol, e.g.:
    FORMREZ (Witco)
Acrylate rubber (ACM) e.g.:
    HYDRIN (Polysar)
    HERCOLOR (Hercules)
or a combination of the above substances.

The formation of the outer sole of the elastomer is carried out in such a manner that the elastomers plastify at the usual processing temperatures and are injected into the mold cavities according to the usual technology and corresponding high pressures of injection molding machines.

The control of the temperature of the elastomers is carried out such that the temperature of the injected outer soles is cooled to just below the decomposition temperature of the polyurethane for the inner sole to be produced and then the mixture reacting into the polyurethane is brought into contact with the outer sole, whereby in the contacting surfaces between the elastomer and the reacting polyurethane isocyanate reacts with the reactive end groups.

Taken into account in the control of the temperature of the elastomer is that a temperature increase or a temperature reduction of 10° C. leads to a shortening or lengthening of the vulcanization time, i.e., the time needed for the elastomer to complete its reaction, by 50%.

One of the problems encountered with the molding apparatus of the aforementioned application Ser. No. 942,832, is that the cooling rate of the molded outer sole of elastomer to the temperature at which the mixture reacting at the polyurethane for the inner sole is introduced into the mold cavity for the inner sole is essentially determined by the high heat capacity of the mold parts located on the pivotable mold carrier. This cooling rate has the effect that the time required for the molding and cooling of an outer sole is considerably longer than the time required for molding the inner sole.

Another problem is encountered due to the fact that the cooling of the outer sole from the relatively high temperature at which a plastified elastomer is injected at the temperature for molding the inner sole has the effect that the outer soles generally experience a change in dimension which cannot be discounted. Therefore, it is not possible to ignore this i.e., general shrinkage of all elastomers, and to permit the mold part with the mold cavity employed for molding the outer sole of the elastomer and now supporting the cold outer sole, to work together subsequently with the lateral mold elements and the shoe last mounted shoe upper for the production of the inner sole.

SUMMARY OF THE INVENTION

It is therefore an object of the present invention to mold outer and inner soles on to shoe uppers in a manner avoiding the shrinkage of the outer sole of elastomer during the molding operation.

Accordingly, the pivotable mold carrier of the present invention mounted on an upper vertically adjustable cross block has a heatable first mold part at one end in engagement with a heatable mold plate of a lower vertically adjustable cross block so as to define a mold cavity for the outer sole to be molded, the mold carrier having a second mold part at its opposite end which works together with closed lateral mold elements and a shoe last-mounted shoe upper which together with an already molded outer sole defines a mold cavity for the inner sole. A shoe last holder is mounted above the lateral mold elements for pivotable movement about a transverse axis and for vertical movement between extended and retracted positions, the last holder having a shoe last at one end supporting a shoe upper and having a rod at its opposite end supporting a transfer plate for a molded outer sole. The first mold part containing the molded outer sole confronts the transfer plate with the last holder pivoted into its cooling position and engages the transfer plate in the extended positions of last holder and the mold carrier, such that the transfer plate when retracted removes the molded outer sole from the first mold part to allow cooling thereof as the mold carrier is again pivoted such that the second mold part engages the transfer plate which transfers the molded outer sole thereto. In the molding position the molded outer sole in the second mold part cooperates with the lateral mold elements in their mold closed position and with the last supported shoe upper in the extended position of the last holder to form a cavity for molding an inner sole of thermoplastic material and for chemically bonding the material to the molded outer sole and to the shoe upper.

Such an arrangement has the effect that the still hot outer sole of elastomer is removed by the transfer plate and, after it has sufficiently cooled, is transferred, for further shrinkage temperature cooling, to the mold cavity of the second mold part which thereafter functions together with the lateral mold elements and the last supported shoe upper to define a cavity for the molding of the inner sole of polyurethane.

The mold cavity for molding the outer sole of elastomer is sized such that the outer sole after cooling on the transfer plate has the desired dimension of the finished shoe, i.e. the mold cavity of the second mold part which functions together with the lateral mold elements and the last supported shoe upper also has the dimensions of the outer sole after cooling in its final condition.

Also, the second mold part may be provided with vacuum channels opening into its mold cavity to assist in transfer of the molded outer sole from the transfer plate.

Figure 1:
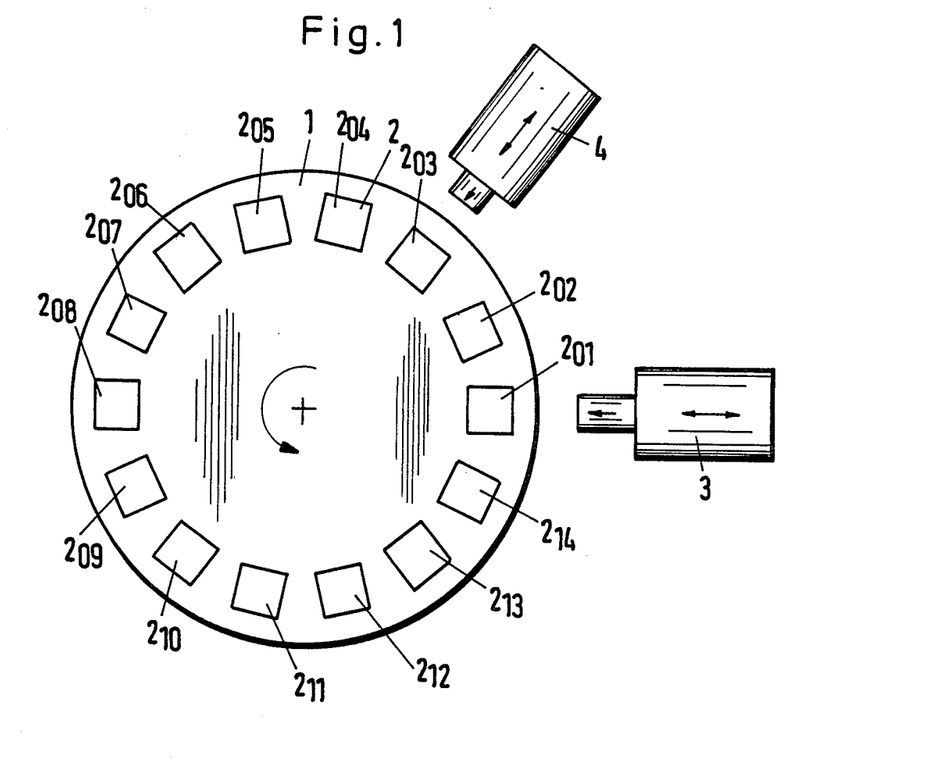
FIG. 1 is a schematic top plan view of a circular turntable showing a plurality of stations at each of which an apparatus according to the invention is located, an injection device for the outer sole material and a mixing/injection device for the inner sole material being shown relative to the turntable.

DETAILED DESCRIPTION OF THE INVENTION turntable 1 in FIG. 1 illustrates 14 molding stations 2 arranged equally spaced and schematically illustrated by squares. The squares also illustrate the positions which the molding stations assume during the incremental rotation of the turntable. With the present arrangement, each mold station will reach its original position after 15 incremental turns of the turntable. The positions are designated $2_{01}$ to $2_{14}$.

A radially disposed plastification and injection aggregate device 3 for an elastomer is located adjacent the periphery of the turntable. After each incremental movement of the turntable, i.e. equal to a 1/14 th turn, device 3 is locked in some normal manner relative to one of the molding stations 2 shown in position $2_{01}$, and is capable of shifting radially relative to the turntable. When the device 3 is interlocked with the mold station, elastomer for the outer soles is injected into the mold cavity of the apparatus.

Also arranged in a radially shiftable manner relative to the turntable is a device 4 for the mixing of the mixture reacting into polyurethane. After each incremental turn of the turntable this device can also be interlocked with one of the work stations which had been rotated to the corresponding work station $2_{03}$, so that material for molding the inner sole is injected into the mold cavity of the apparatus. Depending on the reaction or vulcanization time of the materials used, the two devices can be interchanged from that shown.

Molding apparatus 2 is shown in detail in FIGS. 2 to 6 in various working positions as viewed in the direction of the single arrows on devices 3 and 4.

Figure 2:
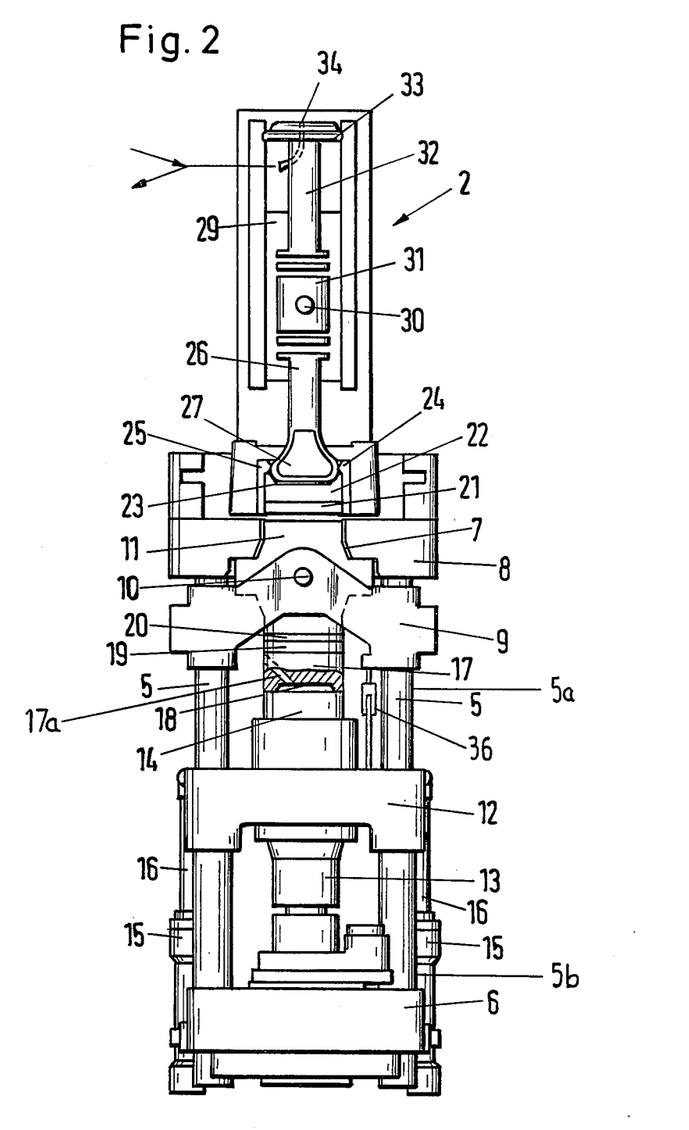
FIGS. 2 to 6 are schematic views in side elevation of the details of the present apparatus illustrating the various operations of the molding apparatus carried out during the molding operation.

The mold parts for molding apparatus 2 of FIG. 2 for the molding of the outer sole and for the molding of the inner sole are shown in closed position.

The apparatus has a generally upstanding frame structure which includes four spaced upstanding guide posts 5, of which only two are visible. A lower fixed cross block 6 and an upper fixed cross block 8, having a central opening 7, form a fixed guide frame together with guide posts 5 fixed at opposite ends to blocks 6 and 8. An upper, vertically movable cross block 9 is mounted for sliding movement along guide post sections $5a$ of smaller diameter compared to guide post sections $5b$. A mold carrier 11 is mounted on block 9 for pivotable movement about the central axis of transverse bolt 10. A lower, vertically moveable cross block 12 is arranged for sliding movement along larger diameter sections $5b$ of the guide posts.

Hydraulic or pneumatic piston and cylinder units 15, 16 extend between cross blocks 12 and 6 for vertically moving both cross blocks 9 and 12 into the mold closing position of FIG. 2 in which mold carrier 11 is fully extended so as to bear against cross block 8 adjacent its central opening. A mold locking cylinder 13 operating between blocks 6 and 12 locks the cross blocks in the mold closing position. And, a heatable plate 14 mounted on cross block 12 bears against one end of the mold carrier in the FIG. 2 position.

The mold carrier has a heatable first mold part 17 at such one end with a cavity 18 sized to that of the outer sole to be molded. The heat plate 14 bears against this mold part 17 in the mold closed position of FIG. 2, and a back up heat plate 19 is secured to mold part 17 and is attached to the mold carrier via an insulating layer 20.

The mold carrier has a second mold part 22 at its opposite end formed with a mold nest 23, and an insulated cooling plate 21 interconnecting mold part 22 to the mold carrier. The cooling plate may be provided with passages (not shown) through which a cooling medium flows. And, mold nest 23 is sized to the dimension of the outer sole after cooling.

Figure 3:
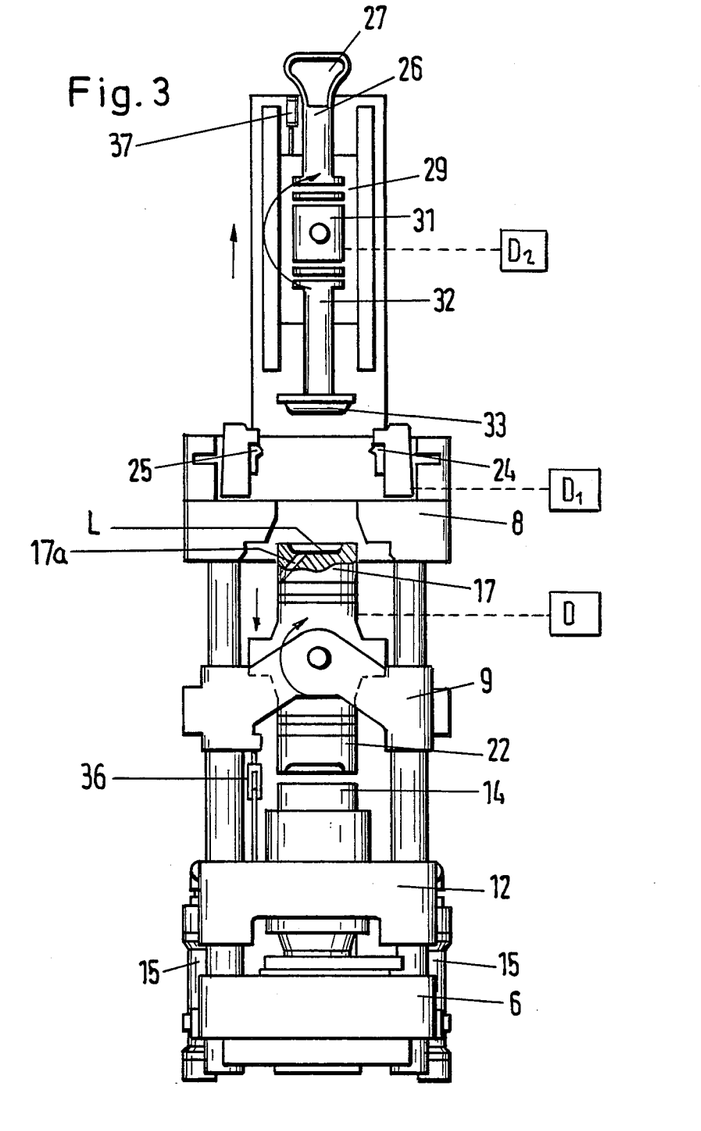

A pair of opposing, laterally movable side mold elements 24, 25 are mounted on the upper surface of cross block 8 for movement between the mold closed position of FIG. 2 and the mold open position of FIGS. 3 to 6. Suitable actuation means, such a $D_1$ schematically shown in FIG. 3, is provided for shifting the lateral mold elements between their extended and retracted positions. In the mold closed position of FIG. 2, the closed mold elements 24, 25 together with a shoe upper 27 supported on a shoe last 26, and mold part 22 containing an already formed outer sole (as will hereinafter be more fully described in detail) define a mold cavity for the molding of the inner sole.

As high peak pressures occur during the injection of outer soles of elastomer, comparable to those peak pressures which take place in injection molding machines for the processing of plastic material, the usual drive cylinders and mold locking cylinders are required similar to those employed in such injection molding machines.

During injection of the plastified elastomer into mold cavity 18 in the mold closed position of FIG. 2, wherein the mold cavity is delineated by heatable plate 14 and mold part 17 in the closed position, the reaction force applied to the frame is taken up by cross blocks 6 and 8 as pivotable mold part carrier 11 bears against cross block 8 at the surrounding area of its opening 7. Linkages 36 (only one being shown for clarity), or the like, are schematically illustrated as extending between cross blocks 9 and 12 such that the upward vertical movement of cross block 12 via drive units 15, 16 is transmitted to cross block 9.

A last holder 29, of known construction, has a last body 31 mounted on the frame structure of the apparatus above cross block 8 for vertical movement between its lower or extended position of FIG. 2 and its upper or retracted position of FIG. 3. Some suitable means such as a hydraulic piston and cylinder unit 37 or the like may be provided to effect vertical adjustment. Also, the last holder is mounted for pivotal movement about a transverse bolt 30 between its FIG. 2 and FIG. 3 positions. Some suitable turning means, schematically shown as $D_2$, may be provided for turning. Shoe last 26 extends from one end of last body 31, and a rod 32 extends from the opposite end of the last body. A transfer plate 33 is mounted at the free end of rod 32. The plate has a plurality of channels 34 (only one shown for clarity) opening into its end surface through which negative or positive pressures can be transmitted from suitable sources depicted by the arrows in FIG. 2.

FIG. 2 illustrates the relative positions of the cross blocks of the molding apparatus 2 at station $2_{01}$ (FIG. 1). At this station the plastification and injection aggregate device 3 is radially moved toward the turntable and abuts a pour opening (not shown) of mold cavity 18 for injecting plastified elastomer into the mold cavity for molding an outer sole L. The mold cavity remains closed until, after a corresponding number of incremental moves of the turntable, the molding apparatus at station $2_{01}$ has reached station $2_{11}$, after passing through stations $2_2$ through $2_{10}$. At station $2_{11}$ the pistons of units 15, 16 are retracted causing cross blocks 12 and 9 to lower to their FIG. 3 position. Block 12 slides along guide post sections 5b, and block 9 slides along guide post sections 5a and is stopped as it bears against shoulders (not shown), or the like, at the transition between the different diameter sections 5a, 5b. Pressure springs 36 permit block 9 to stop in the position shown in FIG. 3 while block 12 moves slightly further away therefrom to provide a clearance between the mold carrier and heat plate 14, as shown. Mold carrier 11 is then pivoted to its FIG. 3 position through 180° by actuation by some suitable drive means D so that cold mold part 22 confronts heat plate 14 and heatable mold part 17 containing the still hot outer sole of elastomer confronts opening 7 of cross block 8. Channels 17a (only one shown for clarity) may be provided in mold part 17 through which negative pressure is transmitted to cavity 18 for retaining molded outer sole L in the cavity during pivotal movement of the mold carrier to the FIG. 3 position.

And, last holder body 31 is retracted away from block 8 while the two lateral mold elements 24, 25 are simultaneously moved apart to their maximum open position of FIG. 3. The last body is then rotated through 180° so that rod 32 with its transfer plate 33 confronts molded outer sole L supported in mold part 17.

Figure 4:
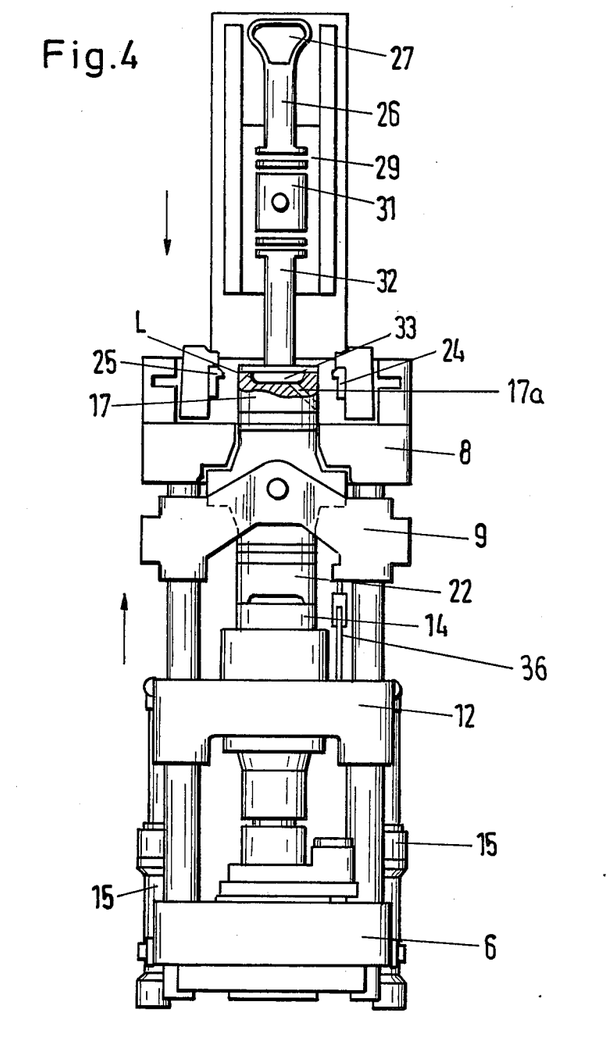

As shown in FIG. 4, the last body is then extended to its lower position, and the pistons of drive units 15, 16 are extended for moving cross blocks 9 and 12 upwardly so as to extend the mold carrier toward transfer plate 33 until the transfer plate contacts the molded outer sole L. The molded outer sole is then transferred to plate 33 by the suction produced through channels 34.

Figure 5:
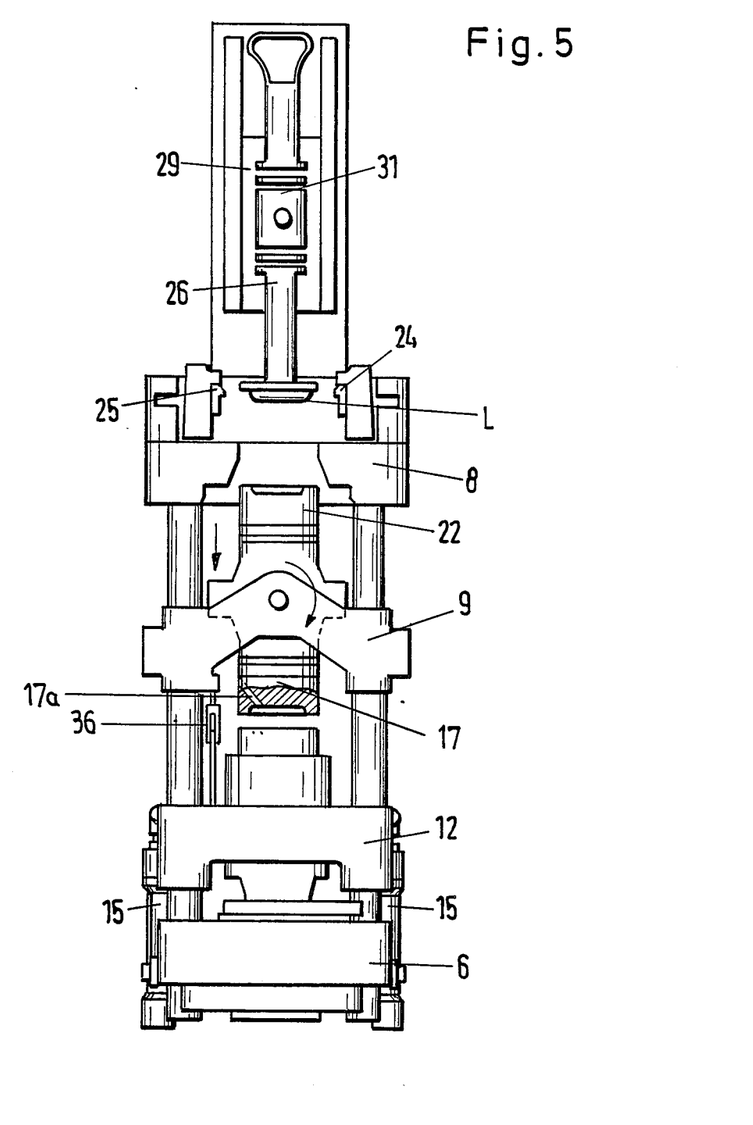
Figure 6:
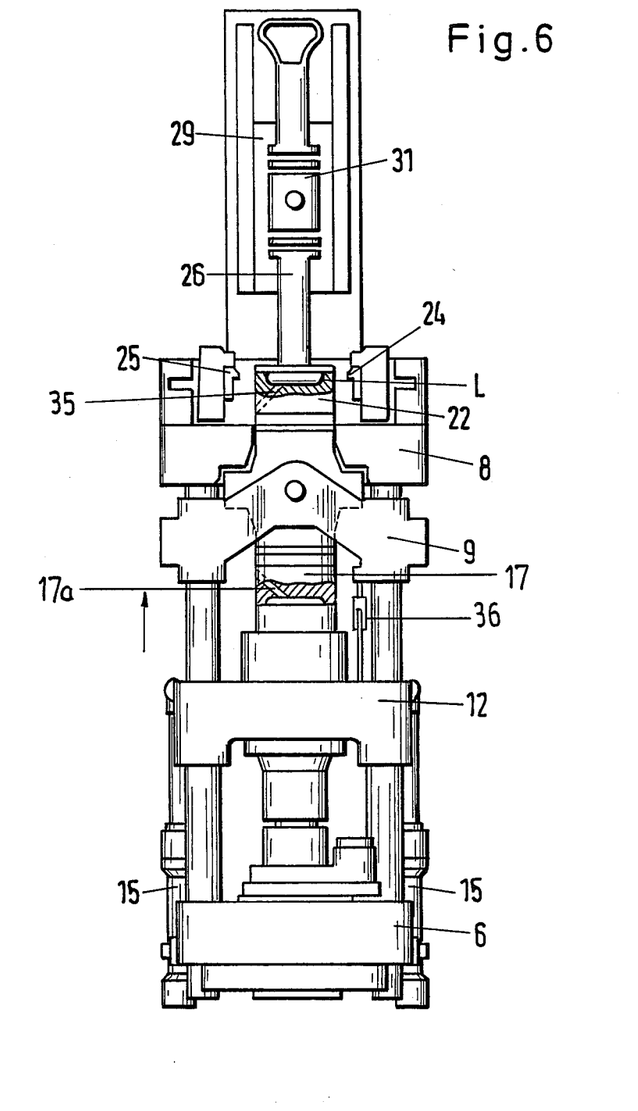

Referring to FIG. 5, the pistons of drive units 15, 16 are now retracted for lowering blocks 9 and 12 back to the FIG. 3 position for retracting the mold carrier and for separating it from plate 14 to permit the mold carrier to be rotated through 180° such that mold part 22 again confronts transfer plate 33. Molded outer sole L is able to cool in the FIG. 5 position of the molding apparatus parts. The pistons of drive units 15, 16 are then again extended for raising blocks 9 and 12 to the FIG. 6 position in which the mold carrier is extended such that the molded outer sole L is brought into contact with plate 33. In this position, the cooled mold part 22 assists in further cooling the molded outer sole, and channels 34 in plate 33 may now be pressurized for transferring molded outer sole L to mold part 22. Mold part 22 may be provided with channels 35 (only one shown for clarity), shown in FIG. 6, subjected to a vacuum source (not shown) for assisting in the transfer of the molded outer sole from plate 33 to mold part 22. After release of the molded outer sole to mold cavity 23, the last holder body is retracted back to its upper position of FIG. 3. In this position, the last holder is rotated through 180° so that its last holder confronts block 8 whereafter the last body is extended to its lower position of FIG. 2, and lateral mold elements 24, 25 are closed for tightly engaging about the sides of shoe upper 27.

In the mold closed position of FIG. 2, the mixture reacting into polyurethane is injected by device 4 into the mold cavity formed by the closed lateral mold elements, the last supported shoe upper and the molded outer sole L, through an injection sprue hole (not shown) which may be located in one or both of the lateral mold elements. Thereafter, the shoe with the finished outer and inner soles is removed from the last in any normal manner and a new shoe upper is mounted on the last for a repeat of the molding operation according to the various steps as aforedescribed.

From the above description it can be clearly seen that in the stationary position of the circular turntable an outer sole and an inner sole are respectively injected at the same time and, simultaneously, in the area between stations $2_{04}$ or $2_{14}$ a finished shoe having a molded outer sole of elastomer and a molded inner sole of polyurethane is removed at a discharge station (not shown).

A circular turntable has been described as rotatable through short increments, although it is within the scope of the invention to also provide individual mold stations located on a turntable. In such arrangement, the device 4 for mixing of the mixture reacting into the polyurethane and the device 3 for the plastification and injection aggregate for the elastomer would be arranged above one another.

As previously described, the injection of the plastified elastomer into the cavity for the outer sole is carried out with the molding apparatus at station $2_{01}$ which will then move through stations $2_{01}$ through $2_{11}$ without changing the relative positions of the movable cross blocks. From station $2_{11}$ to station $2_{03}$ the vertically movable cross blocks and the vertically movable last holder perform the moves described with reference to FIGS. 2 to 6, as well as the pivoting moves of the pivotable mold carrier and the last turning body, whereby then the mixture reacting to polyurethane is fed into the closed mold cavity for the inner sole. The same applies for all mold stations 2.

The same also applies correspondingly for circular turntable installations with a greater or fewer number of mold stations and positions of the circular table than shown.

The mold apparatus according to the invention can employ different mold parts for the vulcanization of the injected outer sole of elastomer and for the cooling of the vulcanized outer sole, so that the times for the vulcanization and the cooling can be set independent of each other.

Moreover, it is essential that the total time for the vulcanization and cooling of the outer soles until further processing is considerably shorter than with the use of mold parts which must be heated for vulcanization and then cooled for the cooling of the outer sole.

What is claimed is:

1. Apparatus for molding outer and inner soles on to shoe uppers, comprising an upstanding frame structure including a vertically movable upper cross block, a mold carrier mounted on said cross block for pivotal movement about a transverse axis, said mold carrier including a heatable first mold part at one end for the molding of outer soles of an elastomer, a vertically movable lower cross block having a mold plate in engagement with said first mold part in a molding position of said cross block and said mold carrier, said first mold part defining a mold cavity into which an elastomer is injected for molding an outer sole, means for raising and lowering said blocks between extended and retracted positions of said mold carrier, said first mold part disengaging from said mold plate in said retracted position, laterally movable mold elements mounted on said frame structure above said upper cross block, means for moving said mold elements between mold open and mold closed positions, said mold carrier further including a second mold part at an opposite end thereof, a shoe last holder mounted on said frame structure above said lateral mold elements for pivotal movement about a transverse axis between said molding position and an outer sole cooling position, and for vertical movement between extended and retracted positions relative to said mold carrier, means for pivoting and for vertically moving said last holder, said last holder having a shoe last at one end supporting a shoe upper and having a rod at its opposite end supporting a transfer plate, means for pivoting said mold carrier to a position in which said first mold part contains the molded outer sole and confronts said transfer plate with said last holder in said cooling position and engages said transfer plate in the extended positions of said last holder and said mold carrier, whereby said transfer plate when retracted removes the molded outer sole from said first mold part to allow cooling thereof as said mold carrier is pivoted to a position in which said second mold part engages said transfer plate which transfers the molded outer sole thereto, in said extended position of said mold carrier the molded outer sole in said second mold part cooperating with said mold elements in said mold closed position thereof and with said last supported shoe upper in said extended position of said last holder to form a cavity for molding an inner sole of thermoplastic material and for chemically bonding said material to said molded outer sole and to said shoe upper.

2. The apparatus according to claim 1, wherein said second mold part includes transfer means for assisting in transferring the molded outer sole from said transfer plate.

* * * * *